May 25, 1965
A. J. THELEN
3,185,020
THREE LAYER ANTI-REFLECTION COATING
Filed Sept. 7, 1961
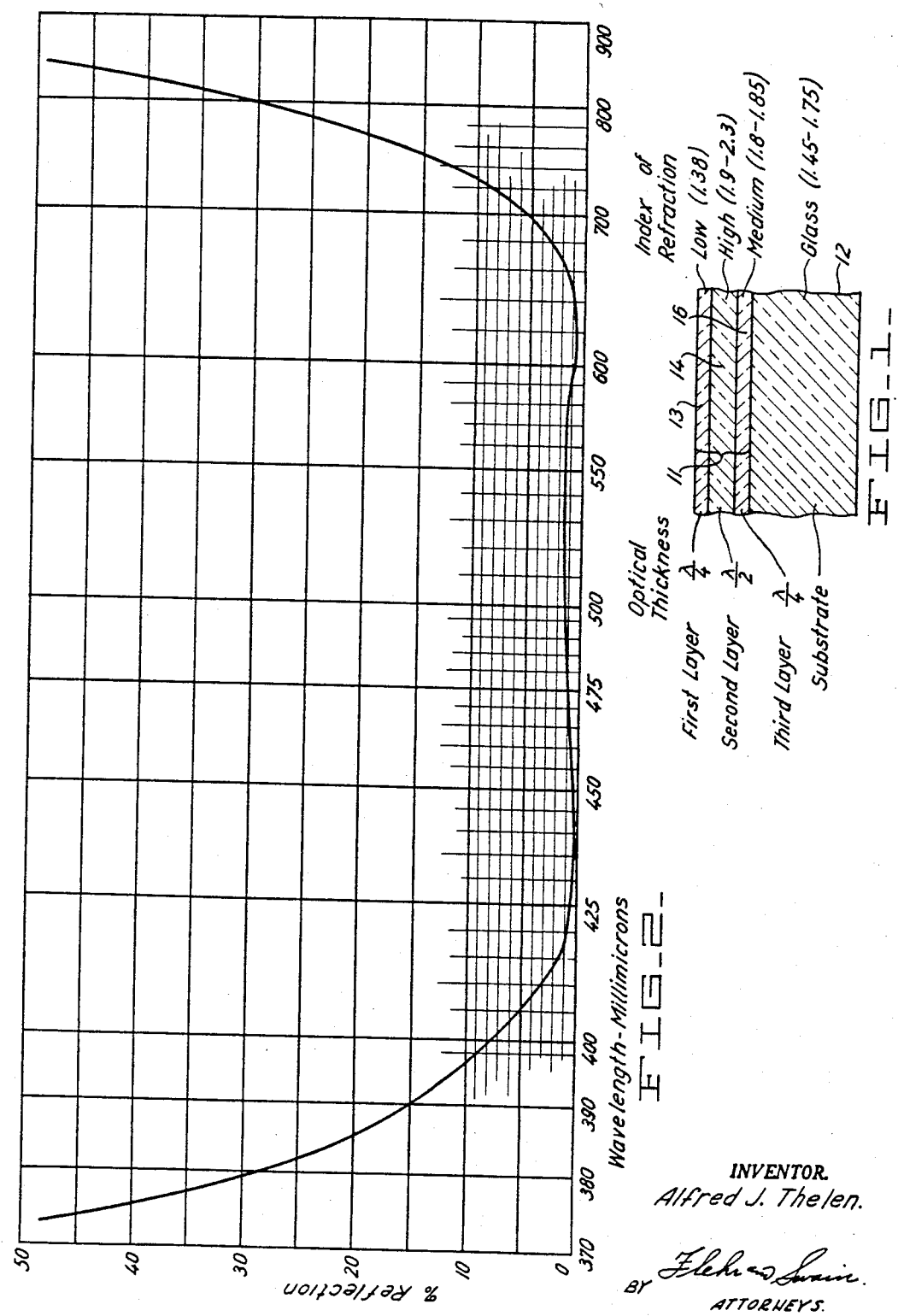
INVENTOR.
Alfred J. Thelen.
BY
ATTORNEYS.

United States Patent Office 3,185,020
Patented May 25, 1965

3,185,020
THREE LAYER ANTI-REFLECTION COATING
Alfred J. Thelen, Santa Rosa, Calif., assignor to Optical Coating Laboratory, Inc., Santa Rosa, Calif., a corporation of Delaware
Filed Sept. 7, 1961, Ser. No. 136,479
2 Claims. (Cl. 88—1)

This invention relates to an anti-reflection coating and more particularly to a high efficiency anti-reflection coating.

Coatings have heretofore been developed for reducing the reflection off of glass and other surfaces. Often this anti-reflection coating consists of a single layer of magnesium fluoride, one-quarter wave length in thickness. Up to the present time, this has been the primary anti-reflection coating which has been used. Some two-layer coatings have been used but it has been found that they are very selective. All of such two-layer coatings have a similar limitation in that the range of substantially zero reflectance is very small and goes up very steeply on opposite sides. One such type of coating provides the V-shaped reflectance curve, whereas other types of such two-layer coatings provide a W-shaped reflectance curve. Thus, although it is possible to obtain a better reflectance with certain two-layer coatings, it is impossible to obtain a substantial increase in overall efficiency of such coatings in comparison to a conventional one-layer coating such as magnesium fluoride.

In Gaiser Patent No. 2,478,385, there is disclosed a proposed three-layer anti-reflection coating together with a curve showing the reflectance. From the curve given, the reflectance appears to be relatively good through a wide range except there is substantial reflection in the blue region which has a reflectance which is greater than the glass itself would reflect. This would be very objectionable in that it would give a yellowish tint in transmission of light. There is, therefore, a need for an improved high efficiency anti-reflection coating.

In general, it is an object of the present invention to provide an anti-reflection coating which is very efficient and which covers a relatively wide range of light.

Another object of the invention is to provide an anti-reflection coating which is particularly adaptable for use in the reduction of double images on the coating for one surface in beam splitters where two images are being created from one picture.

Another object of the invention is to provide a coating of the above character which is particularly useful in eliminating secondary reflections from beam splitters.

Another object of the invention is to provide a coating of the above character which is particularly useful in the reduction of stray light in optical systems.

Another object of the invention is to provide an anti-reflection coating of the above character which is particularly useful in reducing and eliminating unwanted reflections in display systems such as television screens and cathode ray tubes.

Another object of the invention is to provide an anti-reflection coating of the above character which gives a substantial improvement in transmission.

Additional objects and features of the invention will appear from the following description in which the preferred embodiments are set forth in conjunction with the accompanying drawings.

Referring to the drawings:

FIGURE 1 is a greatly enlarged sectional view of a transparent substrate provided with an optical multi-layer anti-reflection coating in accordance with the present invention.

FIGURE 2 is a graph showing the reflectance of a typical anti-reflection coating made in accordance with my invention.

In general, my optical coating consists of first, second and third coating materials arranged in layers. The first layer has an optical thickness of one-quarter wave length; the second layer has an optical thickness of one-half wave length; and the third layer has an optical thickness of one-quarter wave length. The first coating material has an index of refraction of substantially 1.38; the second coating material has an index of refraction from 1.9 to 2.3; and the third coating material has an index of refraction from 1.6 to 1.85. This multi-layer coating is normally mounted on a substrate or body which has a normal light reflecting surface and an index of refraction of approximately 1.45 to 1.75.

More in particular, my optical multi-layer coating as shown in FIGURE 1 consists of a coating which is generally designated at 11 which is deposited on a suitable transparent support or substrate 12. The optical coating consists of three transparent substantially colorless layers 13, 14 and 16 which are identified as first layer, second layer and third layer, respectively, with the third layer being adjacent the substrate 12. The first layer has an optical thickness of one-quarter wave length; the second layer has an optical thickness of one-half wave length; and the third layer has an optical thickness of one-quarter wave length. As is well known to those skilled in the art, the optical thickness is the physical thickness multiplied by the index of refraction of the material. The optical thickness of the layer is normally described in fractions of wave lengths of the light for which the coating is to be used. Each coating has a design wave length and the optical thickness is specified as a fraction of this design wave length.

The first, second and third layers are formed of three different materials having different indices of refraction. The materials chosen depend to a certain extent on the index of refraction of the substrate. Of prime consideration are the indices of refraction of the first and third layers and the substrate. This relationship is established by the formula $$n_1^2 \approx n_3^2/n_s$$

Assuming that the substrate is glass and that it has an index of refraction ranging from 1.45 to 1.75, and picking an index of refraction for glass of 1.50 and substituting in the above formula, we arrive at the following:

$$n_1^2 \approx n_3^2/1.50$$

In order to keep the indices of refraction as low as possible, an index of refraction for the first layer is chosen so that $n_1 = 1.38$. Solving the equation, this establishes that the third layer 16 should have an index of refraction approximately equal to 1.69.

It is well known that a two-layer anti-reflection coating can be made by utilizing a substrate with a first layer and a second layer, with each layer being one-quarter wave length in thickness. It also has been established that the square of the index of refraction of the second layer is equal to the square of the index of refraction of the first layer divided by the index of refraction of the substrate. Therefore, the following equation is given.

$$n_1^2 = n_2^2/n_s$$

It can be seen that this equation is identical to the equation set forth above except that $n_2 = n_3$. It is also known that if in any combination of layers, there is introduced a layer which is one-half wave length in thickness that this layer does not change anything as far as the optical thickness of the other two layers is concerned. Therefore, the same formula which has heretofore been utilized for two-layer coatings can also apply to three-layer coatings at a particular wave length. This makes it possible to obtain low reflectance for three-layer coatings at the particular point that low reflectance can be obtained with two-layer coatings. The introduction of the middle layer merely serves to broaden out this low reflectance region to cover a very wide range. By theoretical studies, I have found that the index of refraction for the middle or second layer is in the region of 1.9 to 2.3 for an index of refraction for the substrate from 1.45 to 1.75.

I have also been able to establish the lower limit for the index of refraction of the second or middle layer by the use of phase considerations. I have established that the index of refraction of the second layer must be greater than the square of the index of refraction of the first layer. Since the first layer is normally magnesium fluoride, we arrive at a lower limit of 1.9. The upper limit for this middle layer is set by practical considerations of the materials available and it has been found by trial and error to be 2.3.

Since the three layers have different indices of refraction, three different materials are required. For the first layer having an index of refraction of substantially 1.38, I have found that magnesium fluoride (MgF) is very suitable material. For the second layer, I have found that zirconium oxide ($ZrO_2$), neodymium oxide ($Nd_2O_3$), tantalum oxide ($TaO_2$), indium oxide ($InO_2$), titanium oxide ($TiO_2$) and certain mixed oxides are suitable. The materials which I have found to be suitable for the third layer consist of cerium fluoride ($CeF_3$), silicon oxide (SiO), lanthanum oxide ($La_2O_3$), thorium oxide ($ThO_2$) and neodymium fluoride ($NdF_3$).

By way of example, one combination of material which I have found particularly satisfactory for glass with an index of refraction from 1.45 to approximately 1.58 is magnesium fluoride for the first layer, zirconium oxide for the second layer and cerium fluoride for the third layer. For glass with an index of refraction of 1.58 to 1.75, I have found that magnesium fluoride for the first layer, zirconium oxide for the second layer and lanthanum oxide for the third layer is particularly satisfactory.

In FIGURE 2, I have shown a reflectance curve obtained from the surface of a glass substrate coated with my high efficiency anti-reflection coating. The substrate had an index of refraction of 1.52. The first layer of the coating was magnesium fluoride; the second layer of the coating was zirconium oxide; and the third layer was cerium fluoride. The ordinate of the graph is in percent reflectance and the abscissa is in wave length in millimicrons. The curve shown is the normal reflectance obtained from the coating which is observed at an angle of 11° which is substantially normal or perpendicular to the surface.

From the graph, it can be seen that the reflectance is essentially below 1% across the whole visible spectrum from 400 millimicrons to 700 millimicrons. From 425 millimicrons to 600 millimicrons, it is below .3%. The integrated reflectance is below .3% which compares to approximately 1.5% for a single layer coating of magnesium fluoride or 1% for a conventional two-layer coating. In addition, it can be seen that in the middle of the visible light range where the human eye is the most sensitive, the reflectance is very low.

By way of comparison, with commercially available anti-reflection coatings, I have found that by comparing double images from the commercially available anti-reflection coating with my new and improved high efficiency anti-reflection coating, an improvement factor of 8 is obtained with my coating.

It is apparent from the foregoing that I have provided a new and improved high efficiency anti-reflection coating which has many applications. For example, it can be utilized for the reduction of double images on coatings for one surface of beam splitters. It is particularly useful in such an application in that it reduces secondary reflections. My anti-reflection coating is also particularly useful in the reduction of stray light in conventional optical systems. As is well known to those skilled in the art, one of the main criteria for determining the quality of an optical system is to determine how much stray light and how much usable light is available. My anti-reflection coating can also be utilized to reduce or eliminate unwanted reflections in display systems. For example, it is very useful for reducing reflection on a television screen from a light shining in a room or in reducing the reflection on a cathode ray tube or similar display device. By utilizing my coating, it is unnecessary to darken the room in order to properly view the display device.

I claim:
1. In the combination of a body having a normal light reflecting surface and an index of refraction from 1.45 to 1.58 and a non-absorbing substantially colorless multiple layer anti-reflection coating disposed on said surface, the anti-reflection coating comprising a transparent first layer having an optical thickness of one-quarter of the design wavelength of anti-reflection coating and having an index of refraction of approximately 1.38, said first layer being formed of magnesium fluoride, a transparent second layer having an optical thickness of one-half of the design wavelength of the anti-reflection coating and having an index of refraction ranging from 1.9 to 2.3, said second layer being formed of zirconium oxide, and a transparent third layer having an optical thickness of one-quarter of the design wavelength of the anti-reflection coating and having an index of refraction from 1.8 to 1.85, said third layer being formed of cerium fluoride, said third layer also being formed of a material having an index of refraction $n_3$ which is determined from the equation

$$n_1^2 \approx n_3^2/n_s$$

where $n_1$ is the index of refraction of the material forming the first layer and $n_s$ is the index of refraction of the material forming the body.

2. In the combination of a body having a normal light reflecting surface and an index of refraction from 1.58 to 1.75 and a non-absorbing substantially colorless multiple layer anti-reflection coating disposed on said surface, the anti-reflection coating comprising a transparent first layer having an optical thickness of one-quarter of the design wavelength of the anti-reflection coating and having an index of refraction of approximately 1.38, said first layer being formed of magnesium fluoride, a transparent second layer having an optical thickness of one-half of the design wavelength of the anti-reflection coating and having an index of refraction from 1.9 to 2.3, said second layer being formed of zirconium oxide, and a transparent third layer having an optical thickness of one-quarter of the design wavelength of the anti-reflection coating and having an index of refraction ranging from 1.8 to 1.85, said third layer being formed of lanthanum oxide and having an index of refraction $n_3$ which is determined from the equation $$n_1^2 \approx n_3^2/n_s$$

where $n_1$ is the index of refraction of the material forming the first layer and $n_s$ is the index of refraction of the material forming the body.

References Cited by the Examiner

UNITED STATES PATENTS 2,478,385    8/49    Gaiser _____ 88—1

OTHER REFERENCES

Hass et al.: "Optical Properties of Various Evaporated Rare Earth Oxides and Fluorides," Article in "Journal of the Optical Society of America," volume 49, No. 2, February, 1959, pages 116–120.

Lockhart et al.: "Three Layered Reflection-Reducing Coatings," article in "Journal of the Optical Society of America," vol. 37, No. 9, September 1947, pages 689–694.

DAVID H. RUBIN, *Primary Examiner.*

UNITED STATES PATENT OFFICE
CERTIFICATE OF CORRECTION

Patent No. 3,185,020                          May 25, 1965

Alfred J. Thelen

It is hereby certified that error appears in the above numbered patent requiring correction and that the said Letters Patent should read as corrected below.

In the sheet of drawings, Figure 1, change the legend "Medium (1.8-1.85)" to read -- Medium (1.6-1.85) --; column 4, lines 27 and 51, for "1.8", each occurrence, read -- 1.6 --.

Signed and sealed this 21st day of December 1965.

(SEAL)
Attest:

RNEST W. SWIDER                          EDWARD J. BRENNER
testing Officer                             Commissioner of Patents